June 26, 1923.

F. C. HANKER

AUTOMATIC SUBSTATION

Filed April 9, 1918

WITNESSES:
Ed. V. Herron
J. H. Procter

INVENTOR
Frederic C. Hanker
BY
Wesley G. Carr
ATTORNEY

Patented June 26, 1923.

1,460,156

UNITED STATES PATENT OFFICE.

FREDERIC C. HANKER, OF WILKINSBURG, PENNSYLVANIA, ASSIGNOR TO WESTINGHOUSE ELECTRIC & MANUFACTURING COMPANY, A CORPORATION OF PENNSYLVANIA.

AUTOMATIC SUBSTATION.

Application filed April 9, 1918. Serial No. 227,431.

*To all whom it may concern:*

Be it known that I, FREDERIC C. HANKER, a citizen of the United States, and a resident of Wilkinsburg, in the county of Allegheny and State of Pennsylvania, have invented a new and useful Improvement in Automatic Substations, of which the following is a specification.

My invention relates to electrical systems and particularly to such systems in which a converter, or other similar device, is adapted to be automatically started and controlled for the purpose of supplying energy to a circuit, under predetermined conditions.

One object of my invention is to provide means for precluding the automatic starting of a rotary converter, under predetermined conditions.

Another object of my invention is to provide a generator having a drooping voltage characteristic for so impressing a voltage on the system that the converter will not be started under a false condition of load on the circuit.

A further object of my invention is to provide a system of the above-indicated character that shall be simple and inexpensive to construct and effective in its operation.

Heretofore, the converters of substations have been provided with voltage-responsive relays for starting the same when the voltage on the load circuit dropped by reason of an increased load thereon. However, when all of the converters of such a system are disconnected and no load obtains on the load circuit, no voltage is supplied thereto and the relays will operate to start the converters.

In view of the above, I provide a relatively small-capacity generator having a drooping voltage characteristic and which is permanently connected to the load circuit. By the use of such a device, normal voltage is maintained on the load circuit to preclude the relays operating under false conditions of excess load, and the voltage characteristic of the generator is such that, when current is taken therefrom, its voltage rapidly decreases to permit the relays to respond to the true load condition in the circuit.

Figure 1:
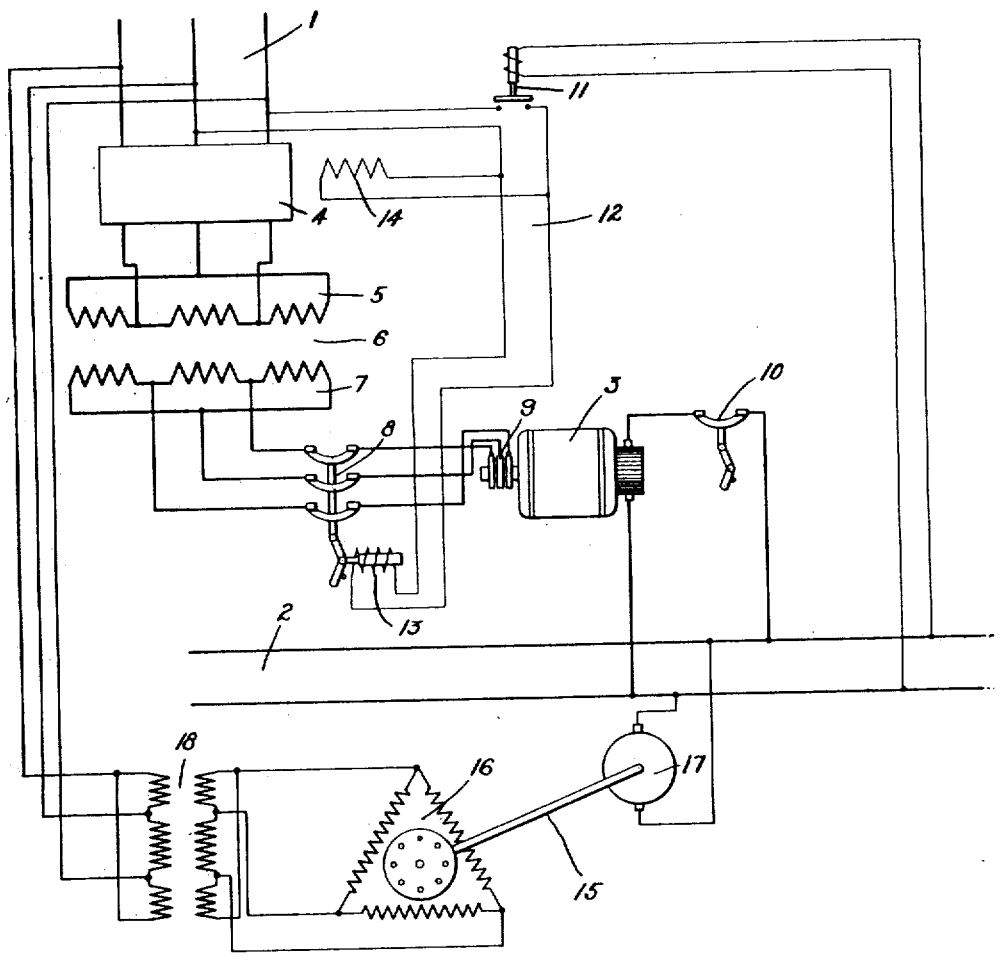
Figure 2:
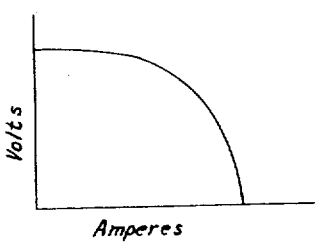

Figure 1 of the accompanying drawings is a diagrammatic view of an electrical system embodying my invention, and Fig. 2 is a diagram illustrating the voltage characteristics of the generator embodying my invention.

An electrical system, embodying my invention, comprises an alternating-current circuit 1, a direct-current load circuit 2 and a rotary or synchronous converter 3 connected therebetween. It is frequently desirable to cause the converter 3 to be started and stopped in accordance with predetermined load and voltage conditions in the direct-current circuit 2. If the converter 3 is located a relatively great distance from the source of alternating current, it is desirable that the starting and stopping of the converter be accomplished by automatic means and, in so doing, the cost of operation of the substation will be relatively small. That is, if the converter 3 be caused to operate only when a predetermined load is connected to the direct-current circuit, it will be understood the only losses in the substation will obtain when the converter is supplying energy.

The conductors of the circuit 1 are operatively connected, through a circuit interrupter 4, to the terminals of the primary winding 5 of a transformer 6, the secondary winding 7 of which is connected, through a circuit interrupter 8, to the collector brushes 9 of the converter 3. The direct-current end of the converter 3 is connected, through a circuit interrupter 10, to the circuit 2.

A voltage-responsive relay 11 is operatively connected across the circuit 2, and is adapted to control a circuit 12 comprising the actuating winding 13 of the circuit interrupter 8 and the actuating winding 14 of the circuit interrupter 4.

A motor-generator set 15, comprising an alternating-current motor 16 and a direct-current generator 17, is connected, through a transformer 18, between the circuits 1 and 2, substantially as shown in the drawing. The generator 17 is adapted to have a drooping voltage characteristic, substantially as shown in the diagram of Fig. 2, and is provided for the purpose of maintaining normal voltage on the circuit 2 under no-load conditions thereon.

The relay 11 is so proportioned that, when sufficient load obtains on the circuit 2 to reduce the voltage on the same a predetermined amount, the relay 11 will effect the energization of the circuit 12 and thereby close the circuit interrupters 4 and 8 to thus start the converter 3 and supply energy to the circuit 2 from the circuit 1. Thus, in electrical railway systems, when a car advances to a position, with respect to the circuit 2, that is within the sphere of operation of the converter 3, the same is started to supply the circuit 2 with energy. It will be understood that the circuit interrupter 8 is shown connected to the high-potential taps of the transformer winding 7 to simplify the description of the apparatus and that, in actual practice, interlocked circuit interrupters may be used for supplying the converter 3 with current first at low potential and then at high potential, substantially as set forth in copending application Serial No. 122,377, filed September 27, 1916, by F. C. Hanker and C. M. Moss and assigned to the Westinghouse Electric and Manufacturing Company.

If the motor-generator set 15 were not provided, the relay 11 would be actuated to start the converter 3 upon removal of all load from the circuit 2 and failure of voltage therein. It will be seen that this condition will obtain under certain conditions of operation of a railway system, such, for example, as obtain when the system is shut down during the night hours. In order to preclude the starting of the converter under such false load conditions, the generator 17 is adapted to supply just sufficient voltage to the circuit 2 to prevent the operation of the relay 11. However, the voltage characteristic of the generator 17 is such that, when current is taken therefrom its voltage rapidly decreases and thus, when a load obtains on the circuit 2, will fall a sufficient amount to ensure the operation of the relay 11.

My invention is not limited to the particular starting and controlling system or to the motor-generator set illustrated, as it may be variously modified without departing from the spirit and scope of the invention as set forth in the appended claims.

I claim as my invention:

1. In an electrical system, the combination with an alternating-current circuit, a direct-current circuit, a converter and voltage-responsive means for controlling the connection of the converter between both circuits in response to the voltage condition of the direct-current circuit, of means for normally maintaining the voltage of the direct-current circuit while there is no load thereon and for so reducing the voltage of the direct-current circuit, when load is placed thereon, that the voltage-responsive means will be caused to effect the connection of the converter between the two circuits.

2. In an electrical system, the combination with an alternating-current circuit, a direct-current circuit, a converter and voltage-responsive means for controlling the connection of the converter between both circuits in response to load conditions in one of the circuits, of means for normally maintaining the voltage of such circuit while no load is connected thereto and for decreasing the voltage of the circuit to such value, when load is connected thereto, that the voltage-responsive means shall be actuated to effect the connection of the converter between both circuits.

3. The combination with a supply circuit, a distributing circuit, a translating device to be connected therebetween and means responsive to a predetermined abnormal electrical condition of the distributing circuit for controlling the connection of the translating device to the circuits, of means for maintaining the electrical condition of the distributing circuit normal while there is no load connected thereto and for producing the predetermined abnormal condition, when load is connected to the distributing circuit, that will render the connection-controlling means operative to effect such connection.

4. The combination with a supply circuit, a distributing circuit, a transformer, and means for controlling the connection of the transformer between the circuits when the voltage of the distribution circuit decreases below a predetermined value, of means for maintaining the voltage of the distributing circuit above the operating value of the connection-controlling means while no load is connected to the distributing circuit and for decreasing the voltage of the circuit to an operating value of the connection-controlling means.

5. The combination with a supply circuit, a distributing circuit, a transformer, and means for controlling the connection of the transformer between the circuits when the voltage of the distribution circuit decreases below a predetermined value, of a generator having a drooping voltage characteristic to maintain the normal voltage of the distributing circuit while no load is connected thereto, and to quickly reduce the voltage of the circuit when load is connected thereto, to cause the connection-controlling means immediately to operate.

6. The combination with a supply circuit, a distributing circuit and an energy transformer adapted to be connected therebetween, of means responsive to a predetermined electrical condition for controlling the connection of the transformer between the circuits and means for producing such condition in the distributing circuit upon the connection of load thereto.

7. The combination with a supply circuit, a load circuit, a transformer adapted to be connected therebetween and means for controlling such connection when the voltage of the load circuit decreases to, or below, a predetermined value, of means for maintaining the distribution circuit voltage normal under certain load conditions and for so reducing the voltage of the distribution circuit under other load conditions, that the voltage-responsive means operates to control the connection of the transformer to the circuits.

8. The combination with two electric circuits and a transforming apparatus to be connected therebetween when a predetermined variable property or characteristic of one circuit changes from one predetermined range to another predetermined range, of means for maintaining the property or characteristic of such circuit within one range under certain load conditions and within the other range under other load conditions.

9. The combination with an alternating-current circuit, a direct-current circuit, a transformer adapted to be connected therebetween under predetermined voltage conditions in the direct-current circuit and voltage-responsive means for controlling such connection, of means responsive to the load connected to direct-current circuit for maintaining the voltage of the direct-current circuit at such value that the voltage-responsive means shall not function, under predetermined load conditions, and for so reducing the voltage under other load conditions, that the voltage-responsive means shall function.

10. The combination with an alternating-current circuit, a direct-current circuit, a transformer adapted to be connected therebetween under predetermined voltage conditions in the direct-current circuit and voltage-responsive means for controlling such connection, of an auxiliary transformer connected between both circuits to maintain the voltage of the direct-current circuit normal under predetermined load conditions and to reduce the voltage under other load conditions to effect the operation of the voltage-responsive connection-controlling means.

In testimony whereof, I have hereunto subscribed my name this 30th day of March, 1918.

FREDERIC C. HANKER.